US008296138B2

(12) United States Patent
Parthasarathy et al.

(10) Patent No.: US 8,296,138 B2
(45) Date of Patent: *Oct. 23, 2012

(54) SYSTEM AND METHOD FOR MOBILE AUTOMATIC SPEECH RECOGNITION

(75) Inventors: Sarangarajan Parthasarathy, New Providence, NJ (US); Richard Cameron Rose, Watchung, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,352

(22) Filed: Nov. 22, 2011

(65) Prior Publication Data
US 2012/0072212 A1 Mar. 22, 2012

Related U.S. Application Data

(63) Continuation of application No. 12/901,016, filed on Oct. 8, 2010, now Pat. No. 8,082,147, which is a continuation of application No. 12/115,034, filed on May 5, 2008, now Pat. No. 7,822,603, which is a continuation of application No. 10/754,927, filed on Jan. 9, 2004, now Pat. No. 7,386,443.

(51) Int. Cl.
*G10L 15/00* (2006.01)

(52) U.S. Cl. ........ 704/231; 704/270; 704/201; 704/251; 704/275; 379/88.17; 379/88.16; 379/88.23

(58) Field of Classification Search ............ 704/275, 704/233, 246, 231, 244, 238, 205, 270, 270.1, 704/251, 201; 455/563, 418, 414.1, 408, 455/409, 420, 432.3, 569.1, 569.2; 701/200, 701/207; 379/88.05, 88.17, 88.16, 88.01–88.04, 379/88.23–88.25

See application file for complete search history.

(56) References Cited

U.S. PATENT DOCUMENTS

| | | | | |
|---|---|---|---|---|
| 6,098,040 A * | 8/2000 | Petroni et al. | | 704/234 |
| 6,317,718 B1 * | 11/2001 | Fano | | 705/14.39 |
| 6,336,090 B1 * | 1/2002 | Chou et al. | | 704/231 |
| 6,366,882 B1 * | 4/2002 | Bijl et al. | | 704/235 |
| 6,401,085 B1 * | 6/2002 | Gershman et al. | | 1/1 |
| 6,501,832 B1 * | 12/2002 | Saylor et al. | | 379/88.04 |
| 6,658,389 B1 * | 12/2003 | Alpdemir | | 704/275 |
| 6,728,671 B1 * | 4/2004 | Johnson | | 704/231 |
| 6,760,699 B1 * | 7/2004 | Weerackody et al. | | 704/233 |
| 6,792,086 B1 * | 9/2004 | Saylor et al. | | 379/88.17 |
| 6,801,604 B2 * | 10/2004 | Maes et al. | | 379/88.17 |
| 6,888,929 B1 * | 5/2005 | Saylor et al. | | 379/88.16 |
| 6,907,111 B1 * | 6/2005 | Zhang et al. | | 379/88.02 |
| 6,996,227 B2 * | 2/2006 | Albal et al. | | 379/355.05 |
| 7,024,364 B2 * | 4/2006 | Guerra et al. | | 704/270 |
| 7,162,414 B2 * | 1/2007 | Stanford | | 704/201 |
| 7,386,443 B1 * | 6/2008 | Parthasarathy et al. | | 704/201 |
| 7,546,382 B2 * | 6/2009 | Healey et al. | | 709/246 |
| 7,822,603 B1 * | 10/2010 | Parthasarathy et al. | | 704/231 |
| 8,082,147 B2 * | 12/2011 | Parthasarathy et al. | | 704/231 |
| 2002/0184373 A1 * | 12/2002 | Maes | | 709/228 |
| 2002/0194388 A1 * | 12/2002 | Boloker et al. | | 709/310 |
| 2003/0005174 A1 * | 1/2003 | Coffman et al. | | 709/318 |
| 2003/0088421 A1 * | 5/2003 | Maes et al. | | 704/270.1 |

* cited by examiner

*Primary Examiner* — Vijay B Chawan

(57) ABSTRACT

A system and method of updating automatic speech recognition parameters on a mobile device are disclosed. The method comprises storing user account-specific adaptation data associated with ASR on a computing device associated with a wireless network, generating new ASR adaptation parameters based on transmitted information from the mobile device when a communication channel between the computing device and the mobile device becomes available and transmitting the new ASR adaptation data to the mobile device when a communication channel between the computing device and the mobile device becomes available. The new ASR adaptation data on the mobile device more accurately recognizes user utterances.

20 Claims, 2 Drawing Sheets

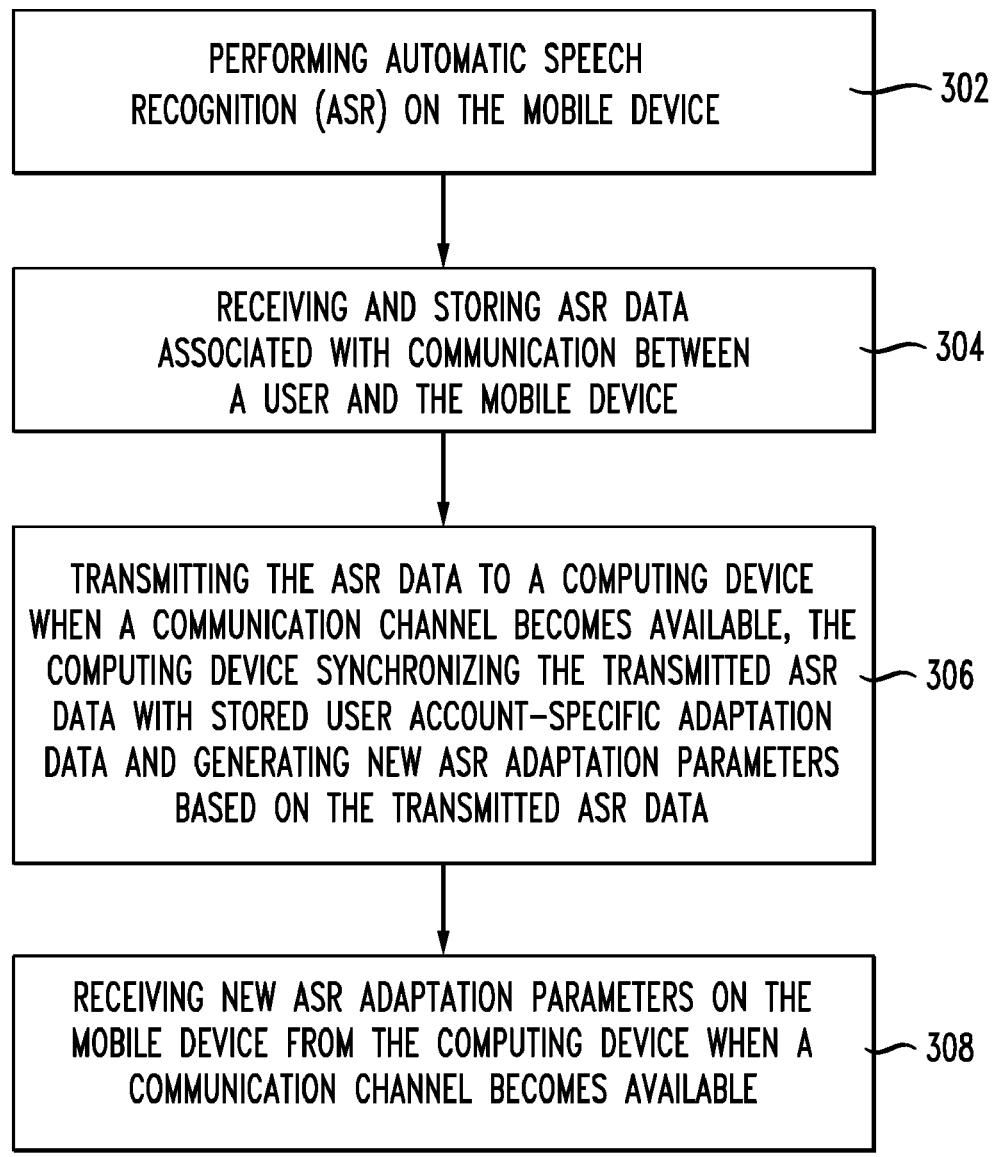

SYSTEM AND METHOD FOR MOBILE AUTOMATIC SPEECH RECOGNITION

PRIORITY

The present application is a continuation of Ser. No. 12/901,016, filed Oct. 8, 2010, which a continuation of U.S. patent application Ser. No. 12/115,034, filed May 5, 2008, now U.S. Pat. No. 7,822,603, which is a continuation of U.S. patent application Ser. No. 10/754,927, now U.S. Pat. No. 7,386,443, filed on Jan. 9, 2004 and relates to U.S. patent application Ser. No. 10/406,368, filed Apr. 3, 2003, the content of which are included herewith in their entirety.

BACKGROUND OF THE INVENTION

1. Field of the Invention

The present invention relates to automatic speech recognition and more specifically to implementing speech recognition on a mobile device.

2. Introduction

The present invention relates to the need for mobile devices to adequately handle the function of automatic speech recognition (ASR). ASR is useful for such simple services as calling phone numbers in response to a user stating "Call Office". As the complexity increases for ASR services, the need for improved and expanded capabilities for ASR also increases. Most mobile devices such as cellphones, personal digital assistants (PDAs) such as palmOne® products and Compaq's iPaq® operate (in general terms) in a client/server network where the mobile device is the "client" communicating via a wireless network with a server.

In implementing ASR—based services on mobile devices, it is sometimes necessary to embed the ASR capability directly on the device rather than to implement ASR on network-based computing resources. Scenarios where this may be necessary include those where one cannot assume a persistent network connection. In these scenarios, even if the service involves updating databases on network computers, it is necessary to obtain information through human-machine interaction conducted independently on the device. Then, once the network communication channel is restored, the updated information collected on the device can be synchronized with the network-based database.

There are many problems associated with implementing ASR on a resource-limited mobile device. These include limitations in memory, computational power, and battery life. These limitations make it impractical to implement procedures designed to configure the ASR system on the mobile device for a particular user, domain, environment or transducer. These procedures often require a great deal of memory and computation and are often difficult to implement using the fixed point processors that exist on mobile devices. There is a need in the art for a system and method for enabling improved ASR on a mobile device having intermittent communication with a wireless network.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

A system and method of updating automatic speech recognition parameters on a mobile device are disclosed. Embodiments of the system aspect of the invention include a server-side computing device within the wireless network and a mobile device on the client-side of the network. Embodiments of the method comprise a method operating on the computing device within the wireless network and a method operating on the mobile device.

An exemplary method comprises storing user account-specific adaptation data associated with ASR on a mobile device, transmitting the user account-specific adaptation data to a computing device associated with a wireless network when a communication channel becomes available, generating new ASR adaptation parameters using the account-specific adaptation data and transmitting the new ASR adaptation parameters to the mobile device. The new ASR adaptation parameters transmitted to the mobile device enable the embedded ASR system to more accurately recognize user utterances during a spoken dialog with the user.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a flowchart illustration another embodiment of the invention.

DETAILED DESCRIPTION OF THE INVENTION

Figure 1:
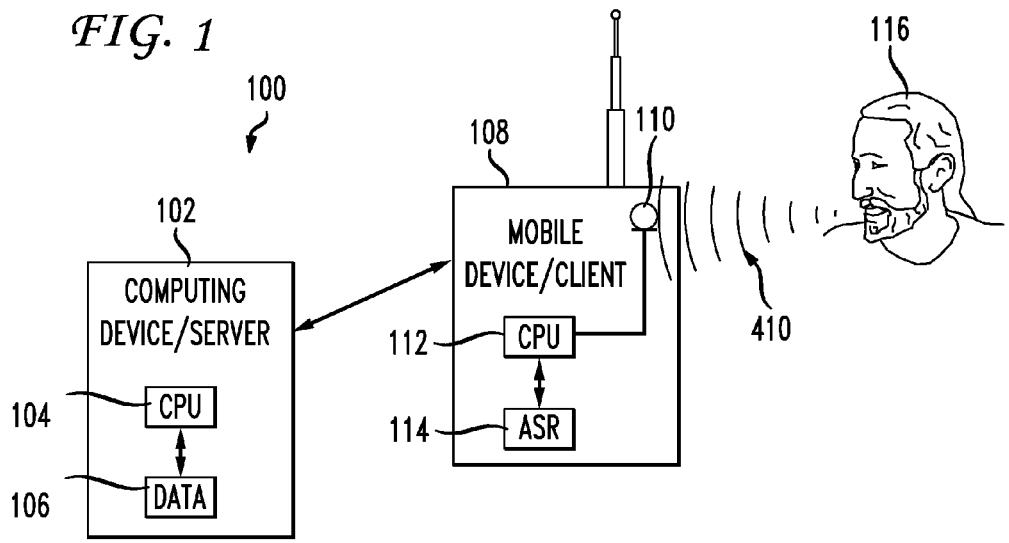
FIG. 1 illustrates the basic components of a wireless network communicating with a computing device.

A distributed framework for implementing automatic speech recognition (ASR) services on wireless mobile devices is presented. The framework is shown to scale easily to support a large number of mobile users connected over a wireless network and degrade gracefully under peak loads. The importance of using robust acoustic modeling techniques is demonstrated for situations when the use of specialized acoustic transducers on the mobile devices is not practical. It is shown that unsupervised acoustic normalization and adaptation techniques can reduce speech recognition word error rate (WER) by 30 percent. It is also shown that an unsupervised paradigm for updating and applying these robust modeling algorithms can be efficiently implemented within the distributed framework.

The above-referenced patent application incorporated above provides details regarding the distributed framework in which the present invention can operate. Therefore, only minor references are provided herein to that framework so that this disclosure can focus on the present invention related to a client/server interaction for updating ASR associated information on a client device for ASR.

This disclosure describes an ASR framework for mobile ASR services. The framework supports directory retrieval ASR applications for users of such devices as the Compaq iPAQ mobile devices over an IEEE 802.11 wireless local area network. While this network configuration is preferable, the invention is independent of any particular wireless protocol, any particular brand or model of mobile device as well as any specific server (computing device).

An experimental study is presented demonstrating the effect of unsupervised speaker and environment compensation algorithms in improving ASR performance when user utterances are spoken through the standard iPAQ device mounted microphone.

There are a large number of applications for mobile devices that include ASR as a key component of the user interface. These include multi-modal dialog applications, voice form-filling applications and value-added applications that provide short-cuts to user interface functions. Speech recognition is generally just one part of a multi-modal dialog architecture for these mobile applications whose functional components can be distributed in different ways between computing resources residing in the network and on the mobile device.

While there are a range of potential distributed ASR architectures that have been proposed for these applications, one can make qualitative arguments for when either fully embedded ASR implementations or network based implementations are most appropriate. For example, when communication channels between a mobile device and a wireless network are unreliable or intermittent, ASR needs to be operable on the mobile device. It is generally thought that fully embedded implementations are most appropriate for value-added applications like name dialing or digit dialing, largely because no network connectivity is necessary when ASR is implemented locally on the device. Distributed or network based ASR implementations are considered appropriate for ASR—based services that require access to large application specific databases where issues of database security and integrity make it impractical to distribute representations of the database to all devices. Network-based implementations also facilitate porting the application to multiple languages and multiple applications without having to affect changes to the individual devices in the network.

Acoustic variability in mobile domains is considered here to be a very important problem that distinguishes ASR in mobile domains from generic ASR domains. The main issue is that users of mobile devices will be using them in a wider variety of continuously varying acoustic environments making the expected conditions far different than one would expect in wire-line telephone or desk-top applications. However, the use of personalized devices and personalized services facilitates a new paradigm for implementing robust algorithms. Speaker, channel, and environment representations can be acquired through normal use of the device all of which can be applied to feature space and model space transformation in ASR. The feature domain speaker normalization/transformation algorithms described below are applied and evaluated under this paradigm.

ASR systems that are embedded on mobile devices are provided with acoustic and language models that are in many cases independent of the ASR task, independent of the user, and independent of environment and transducer associated with the device. This is generally unavoidable since there are thousands of potential users and the acoustic environment and transducer may be continually changing over the life of the device. It has been shown under many different contexts that the ASR word recognition performance can be dramatically improved by employing a variety of techniques to configure these task-independent ASR models to better reflect the conditions that exist at any given instant.

These techniques operate by adapting speech ASR models or features to better reflect the characteristics of recently observed utterances. They take as input speech utterances and decoded results obtained from the ASR system and produce sets of adaptation parameters. Other dialog-related or mobile-device information may also be gathered by the mobile device. For example, the mobile device may have an IP address or other network identifier associated with it. From the IP address, user or device-related information or characteristics (type of microphone, language selected by the user, user-account information, etc.) may be gathered that can be input to algorithms on the computing device to generate new adaptation parameters for transmission to the mobile device. Further, other user input may be available in a multi-modal mobile device. User data associated with pen-input, stylus-input, keyboard input and a combination of these may also be utilized to generate new adaptation parameters.

Next this disclosure describes the application of normalization and transformation algorithms in the context of the mobile ASR framework described in the incorporated application above. In an exemplary embodiment of the invention, these algorithms are applied to compensating utterances spoken by users of Compaq iPAQ hand-held devices (or any other mobile computing device). The notion of acquiring representations of the speaker, environment, and transducer associated with a given client from utterances spoken during the normal use of the device was discussed above. The algorithms that are applied here under this paradigm include frequency warping based speaker normalization, constrained model adaptation (CMA) and speaker adaptive training (SAT), and cepstrum and variance normalization. Those of skill in the art will understand the operation of each of these algorithms. It is appreciated that this is not an exhaustive list of possible algorithms that may be applied in the present invention.

The algorithms used for these tasks will be applied to compensating utterances spoken into a far-field device mounted microphone with respect to acoustic HMM models that were trained in a mis-matched acoustic environment. Normalization/transformation parameters are estimated using anywhere from approximately one second to one minute of speech obtained from previous utterances spoken by the user of the device. The first technique is frequency warping based speaker normalization. This is performed by selecting a single linear warping function using the adaptation utterances for a given speaker to maximize the likelihood of the adaptation speech with respect to the HMM. Then, during speech recognition for that speaker, the warping factor is retrieved and applied to scaling the frequency axis in mel-frequency cepstrum coefficient (MFCC) bused feature analysis. A "warped HMM" is trained by estimating optimum warping factors for all speakers in the training set and retraining the HMM model using the warped utterances.

There are several regression based adaptation algorithms that obtain maximum likelihood estimates of model transformation parameters. The techniques differ primarily in the form of the transformations. Constrained model space adaptation (CMA) is investigated here. CMA estimates a model transformation $\{A, b\}$ to an HMM, $\lambda$, with means and variances $\mu$ and $\Sigma$, $$\mu'=A\mu-b \; \Sigma'=A\Sigma A^T,$$

in order to maximize the likelihood of the adaptation data, X, $P(X|\lambda, A, b)$. The term "constrained" refers to the fact that the same transformation is applied to both the model means and covariances. Since the variances are transformed under CMA, it is generally considered to have some effect in compensating the HMM with respect to environmental variability as well as speaker variability.

An important implementational aspect of CMA is that this model transformation is equivalent to transforming the feature space, $x'_t = Ax_t + b$. It is applied during recognition to the 39 component feature vector composed of cepstrum observations and the appended first and second order difference cepstrum. A speaker adaptive training (SAT) HMM is trained by estimating an optimum CMA transform for each speaker in the training set and retraining the HMM model using the transformed utterances.

Cepstrum mean normalization (CMN) and cepstrum variance normalization (CVN) were also applied under a similar scenario as the algorithms described above. Normalization vectors were computed from adaptation utterances for each speaker and then used to initialize estimates of normalization vectors for each input utterance. The incorporation of additional speech data provided by this simple modification to standard cepstrum normalization procedures had a significant impact on ASR performance.

The feature normalization/adaptation algorithms described above were used to reduce acoustic mismatch between task independent HMM models and utterances spoken through a Compaq iPAQ hand-held device over the distributed framework described in the incorporated application. Described herein is the scenario under which the dataset for the study included a maximum of 400 utterances of proper names per speaker from a population of six speakers. The utterances were spoken through the device mounted microphone on the hand-held device in an office environment. Since the data collection scenario also involved interacting with the display on the hand-held device, a distance of from approximately 0.5 to 1.0 meters was maintained between the speaker and the microphone. The first 200 utterances for each speaker were used for estimating the parameters of the normalizations and transformations described above after automatic endpointing, this corresponded to an average of 3.5 minutes of speech per speaker. The remaining 1200 utterances, corresponding to isolated utterances of last names, were used as a test set for the experimental study described below.

A baseline acoustic HMM was trained from 18.4 hours of speech which corresponds to 35,900 utterances of proper names and general phrases spoken over wire-line and cellular telephone channels. After decision tree based state clustering, the models consisted of approximately 3450 states and 23,500 Gaussian densities.

The baseline WER on the above test set was found to be 41.5 percent. This can be compared to a WER of 26.1 percent obtained on the same task for a different population of speakers speaking into a close-talking noise-canceling microphone. The goal of the robust compensation algorithms applied here is to close the gap between these two scenarios. It was also shown in previous work that by combining lattices obtained from utterances spoken separately in response to first name and last name fields and rescoring them with a language model that describes the constraints between those fields, a WER of 10.1 percent could be obtained.

Table 1 displays the results for the experimental study as the word error rate (WER) resulting from the use of each of the individual algorithms where parameters are estimated using adaptation data of varying length. Columns 2 through 5 of Table 1 correspond to the WER obtained when 1.3, 6.8, 13.4, and 58.2 seconds of speech data are used for speaker dependent parameter estimation.

TABLE 1

| Compensation Algorithm | Average Adaptation Data Duration (sec) | | | |
| --- | --- | --- | --- | --- |
| | 1.3 | 6.8 | 13.4 | 58.2 |
| Baseline | 41.5 | 41.5 | 41.5 | 41.5 |
| N | 40.2 | 37.2 | 36.8 | 36.8 |
| N + W | 36.7 | 33.8 | 33.6 | 33.3 |
| N + W + C | — | 35.0 | 32.3 | 29.8 |
| N + W + C + SAT | — | 34.4 | 31.5 | 28.9 |

There are several observations that can be made from Table 1. First, by comparing rows 1 and 2, it is clear that simply initializing mean and variance normalization estimates using the adaptation data (N) results in a significant decrease in WER across all adaptation data sets. Second, frequency warping (W) is also shown to provide significant reduction in WER. It is clear that constrained model adaptation (C) actually increases WER when the transformation matrix is estimated from less than 13.4 seconds of adaptation data. However, significant WER rate reductions were obtained as the adaptation data length was increased. It is important to note that the over-training problem observed here for adaptation algorithms resulting from insufficient adaptation data is well known.

Having introduced the above details regarding the invention, this disclosure next turns to the figures. FIG. 1 illustrates the basic computing device and mobile device within a wireless network 100. The computing device 102 includes known components to operate such as a central processing unit 104 that runs operating software that communicates with a data store component 106. This computing device may operate any known operating system (such as the Palm® OS or Microsoft Windows® CE) inasmuch as the particular configuration of the computing device is not material to the present invention. The CPU 104 will be controlled by an executable program that contains instructions to carry out the steps of the invention as set forth herein.

The computing device 102 communicates via a wireless connection to a mobile device 108. The mobile device may be any known device that includes a capability such as a central processing unit 112 that can control the operation of the device to include the means for receiving input from a user 116 via speech and a microphone 110. Automatic speech recognition (ASR) module 114 preferably includes an embedded system for performing ASR independently on the mobile device 108. Other capability is on the mobile device for interacting in a multi-modal fashion with the user. The reduced computational ability of a mobile device and the changing environments in which ASR is performed present challenges to embedded ASR modules. In some cases, the user may be in a quiet environment such as an office. However, often the user will want to utilize the ASR capabilities of the mobile device 108 while driving, in a warehouse, on a bus, or on a subway system. Each of these environments provides a different set of background noises that can adversely affect the success of ASR. Each location or use may also have a specific domain of vocabulary unique or typical of the domain. Various ASR parameters can be modified or regenerated to improve the ASR in this environment but revising these ASR parameters often requires computing power that is beyond the capabilities of the mobile device 108. The data necessary for adaptation is thus collected during normal use of the device. The use may also include multi-modal combinations of speech utterances, pen-input, stylus or keyboard input, analysis of the spoken dialog and decoded results.

The wireless standard or protocol used by the computing device 102 and the mobile device 108 for communication is immaterial to the present invention. Any protocol, such as 802.11, CDMA, GSM/GPRS, EDGE, etc. may be employed and used within scope of this invention. The only requirement is the capability to communicate the ASR parameters according to the process disclosed herein.

Figure 2:
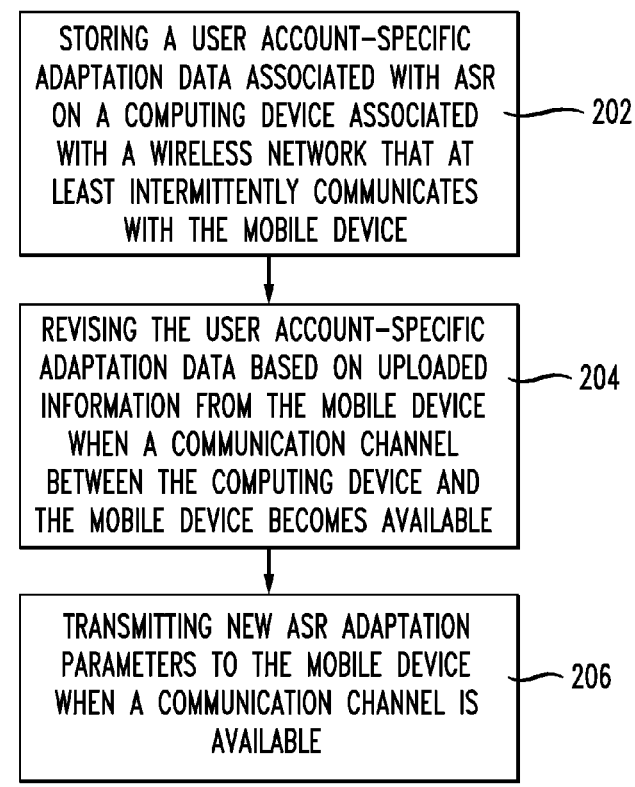
FIG. 2 illustrates a flowchart of a method according to an embodiment of the invention.

FIG. 2 illustrates a method according to an embodiment of the invention. This method preferably is practiced on a computing device 102 within a wireless network. There is no requirement that the steps occur on a single or distributed computing device but it is preferable that the computing device exist within the wireless network in a server configuration as opposed to a server/client configuration over a wireless communication link.

The method comprises storing a user account-specific adaptation data associated with ASR on a computing device associated with a wireless network that at least intermittently communicates with the mobile device (202). One of the advantages of the present invention is when the mobile device 108 only intermittently communicates with the server 102, the method provides a way to take advantage of the increased processing capability of the server computing device 102 while maintaining an updated set of ASR parameters on the mobile device 108 for use by the embedded ASR system 114.

The method further comprises generating new ASR adaptation parameters based on transmitted information from the mobile device when a communication channel between the computing device and the mobile device becomes available (204). In this regard, when the mobile device comes into range of a base station (not shown) of the particular type of communication network, the mobile device 108 will upload information related to ASR, multi-modal data, or other user or mobile device-specific data obtained via analyses on the mobile device 108 of speech utterances, ASR results and other related supervisory information. This ASR data may or may not include information regarding the mobile device 108 environment (e.g., busy street, bus, crowded metro, driving, warehouse, quiet). Therefore, in step (204), the computing device 102 inputs the received data into its appropriate algorithms and generates new ASR adaptation parameters for the particular mobile device.

The final step in this aspect of the invention comprises transmitting the new ASR adaptation parameters to the mobile device when a communication channel between the computing device and the mobile device becomes available. The new ASR adaptation parameters on the mobile device enable the embedded ASR system to more accurately interpret user utterances (206). This step updates the ASR parameters on the mobile device 108 after processing the user-specific adaptation data using the increased computing power of the computing device 102.

FIG. 3 illustrates another embodiment of the invention which is a method of updating ASR parameters associated with an embedded ASR system on a mobile device 108. This method is preferably practiced on the mobile device 108. The method comprises performing automatic speech recognition (ASR) on the mobile device (302). This process envisions performing ASR on the mobile device independent of the computing device 102 within the wireless network. The method further comprises receiving and storing ASR data associated with speech and other multi-modal communication between a user and the mobile device (304). In this regard, while performing ASR on the mobile device, auditory information regarding the current environment of the mobile device 108 is gathered and can be analyzed. This ASR and multi-modal data may include information reflective of the mobile device 108 environment and may further include common vocabulary used. For example, in a warehouse environment where mobile devices are used for inventory control, certain terms may be commonly used as well as certain people may commonly use the same mobile device. Therefore, data such as successful ASR records, corrections and any information associated with the interaction of the device with the user that may be utilized to modify and tune the language, pronunciation models, acoustic models, word phonemes, HMM models, etc. that may reside on the mobile device are recorded. Generating a new set of ASR adaptation parameters within the acoustic and language models that are stored on the mobile device 108 as part of the embedded ASR system will likely require more computing power than is available on the mobile device.

The method addresses this issue by transmitting the ASR data over a wireless link to a computing device associated with the wireless network when a communication channel becomes available, the computing device synchronizing the transmitted ASR data with stored user account-specific adaptation data and generating new ASR adaptation parameters based on the ASR data (306). The computing power of the computing device 102 within the network can then be utilized to revise the specific adaptation data associated with user 116. Either utilizing the same communication channel used to transmit the ASR data from the mobile device 108 to the computing device 102, or in a later-established communication channel, the method comprises receiving the generating new ASR adaptation parameters from the computing device, wherein the new ASR parameters are used for ASR on the mobile device for improved speech recognition accuracy.

In a variation on step (306), the mobile device, because of memory and bandwidth limitations over the wireless link, may perform some processing to compute sufficient statistics that are necessary for adaptation. In this regard, the mobile device does not store raw data obtained from normal use of the device but stores statistical data to insure that the mobile device does not expend its resources storing data over an extended period of time. A memory and wireless bandwidth threshold value may be identified by either the mobile device or computing device prior to switching the storage of data from raw data to storing statistically processed data.

An efficient means for implementing robust acoustic compensation algorithms when there is little opportunity to influence the audio specifications of the device and little opportunity to sample all possible environments in HMM training is disclosed. A set of acoustic compensation procedures described above were applied in an unsupervised user configuration scenario. These procedures, which include frequency warping based speaker normalization, constrained model adaptation, and off-line CMN and CVN, were shown in Table 1 to reduce word error rate by 30 percent.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, other algorithms may be utilized than those mentioned above that perform a revision of the adaptation data on the computing device. Accordingly, the appended claims and their legal equivalents should only define the invention, rather than any specific examples given.

We claim:

1. A method comprising:
   receiving, at a first device, automatic speech recognition data from a second device used for speech recognition, wherein the automatic speech recognition data comprises information associated with at least one of a speaker, an environment, an utterance, and a transducer;
   analyzing the automatic speech recognition data to yield automatic speech recognition adaptation parameters; and
   transmitting the automatic speech recognition adaptation parameters to the second device for use in recognizing speech on the second device.

2. The method of claim 1, wherein the second device is a mobile device.

3. The method of claim 1, wherein the automatic speech recognition data comprises at least one of:
   a representation of an environment of the second device and multi-modal data associated with a multi-modal input from a user.

4. The method of claim 1, wherein the automatic speech recognition data comprises an automatic speech recognition output from the second device.

5. The method of claim 1, wherein the first device is remote from the second device.

6. The method of claim 1, wherein the automatic speech recognition adaptation parameters are based on the automatic speech recognition data and stored user specific adaptation data.

7. The method of claim 1, wherein the automatic speech recognition data comprises audio data gathered by the second device during automatic speech recognition with a user.

8. A system comprising:
   a processor; and
   a memory storing instructions for controlling the processor to perform steps comprising:
      receiving, at a first device, automatic speech recognition data from a second device used for speech recognition, wherein the automatic speech recognition data comprises information associated with at least one of a speaker, an environment, an utterance, and a transducer;
      analyzing the automatic speech recognition data to yield automatic speech recognition adaptation parameters; and
      transmitting the automatic speech recognition adaptation parameters to the second device for use in recognizing speech on the second device.

9. The system of claim 8, wherein the automatic speech recognition data comprises at least one of:
   a representation of an environment of the second device and multi-modal data associated with a multi-modal input from a user.

10. The system of claim 8, wherein the first device is remote from the second device.

11. The system of claim 8, wherein the second device is a mobile device.

12. The system of claim 8, wherein the automatic speech recognition data comprises an automatic speech recognition output from the second device.

13. The system of claim 8, wherein the automatic speech recognition adaptation parameters are based on the automatic speech recognition data and stored user specific adaptation data.

14. The system of claim 8, wherein the automatic speech recognition data comprises audio data gathered by the second device during automatic speech recognition with a user.

15. A non-transitory computer-readable storage medium storing instructions which, when executed by a computing device, cause the computing device to perform steps comprising:
   receiving, at a first device, automatic speech recognition data from a second device used for speech recognition, wherein the automatic speech recognition data comprises a representation of at least one of a speaker, an environment, an utterance, and a transducer;
   analyzing the automatic speech recognition data to yield automatic speech recognition adaptation parameters; and
   transmitting the automatic speech recognition adaptation parameters to the second device for use in recognizing speech on the second device.

16. The non-transitory computer-readable storage medium of claim 15, wherein the automatic speech recognition data comprises at least one of:
   a representation of an environment of the second device and multi-modal data associated with a multi-modal input from a user.

17. The non-transitory computer-readable storage medium of claim 15, wherein the first device is remote from the second device.

18. The non-transitory computer-readable storage medium of claim 15, wherein the second device is a mobile device.

19. The non-transitory computer-readable storage medium of claim 15, wherein the automatic speech recognition data comprises an automatic speech recognition output from the second device.

20. The non-transitory computer-readable storage medium of claim 15, wherein the automatic speech recognition adaptation parameters are based on the automatic speech recognition data and stored user specific adaptation data.

* * * * *